United States Patent
Stapelfeld et al.

[11] Patent Number: 6,079,367
[45] Date of Patent: Jun. 27, 2000

[54] ANIMAL TRAINING APPARATUS AND METHOD

[75] Inventors: Norval D. Stapelfeld, Brookline; Cortland G. Sandberg, Hampton, both of N.H.

[73] Assignee: DogWatch, Inc., Wayland, Mass.

[21] Appl. No.: 08/948,452

[22] Filed: Oct. 10, 1997

[51] Int. Cl.⁷ .......................... A01K 15/02; H01H 36/00
[52] U.S. Cl. .................... 119/720; 119/721; 119/719; 119/859; 119/908; 340/573.3; 335/205
[58] Field of Search .................... 119/721, 719, 119/720, 859, 51.02, 908; 340/573, 573.1, 573.3; 335/205, 206, 207

[56] References Cited

U.S. PATENT DOCUMENTS

| | | | |
|---|---|---|---|
| D. 330,173 | 10/1992 | Juliana et al. | D10/106 |
| D. 330,685 | 11/1992 | Juliana et al. | D10/106 |
| D. 336,055 | 6/1993 | Juliana et al. | D10/106 |
| 2,023,950 | 12/1935 | Carter | 175/311 |
| 2,034,738 | 3/1936 | Beverage | 250/15 |
| 2,642,524 | 6/1953 | Bayliss | 250/6 |
| 2,703,344 | 3/1955 | Anderson | 179/107 |
| 2,741,224 | 4/1956 | Putnam | 119/29 |
| 2,800,104 | 7/1957 | Cameron et al. | 119/29 |
| 2,872,568 | 2/1959 | Provaz | 250/20 |
| 2,899,548 | 8/1959 | Boughtwood et al. | 250/8 |
| 2,996,043 | 8/1961 | Pettingill | 119/131 |
| 3,035,169 | 5/1962 | Griffith | 250/15 |
| 3,037,114 | 5/1962 | Bier et al. | 250/20 |
| 3,182,263 | 5/1965 | Gossard | 325/370 |
| 3,195,049 | 7/1965 | Altman et al. | 325/305 |
| 3,368,151 | 2/1968 | Verwey et al. | 325/370 |
| 3,403,341 | 9/1968 | Munch | 325/65 |
| 3,495,175 | 2/1970 | Munch | 325/65 |
| 3,589,337 | 6/1971 | Doss | 119/29 |
| 3,608,524 | 9/1971 | Waltz | 119/29 |
| 3,618,067 | 11/1971 | DeVale | 340/282 |
| 3,631,344 | 12/1971 | Greenwald | 325/305 |
| 3,718,889 | 2/1973 | Bartlett | 339/103 R |
| 3,777,712 | 12/1973 | Gardner et al. | 119/29 |
| 3,827,403 | 8/1974 | Meyer | 119/29 |
| 3,897,753 | 8/1975 | Lee et al. | 119/51 R |
| 3,980,051 | 9/1976 | Fury | 119/29 |
| 3,983,483 | 9/1976 | Pando | 325/16 |
| 4,041,496 | 8/1977 | Norris | 343/113 DE |
| 4,074,230 | 2/1978 | Icenbice, Jr. | 340/146.1 BE |
| 4,101,836 | 7/1978 | Craig et al. | 325/302 |
| 4,136,338 | 1/1979 | Antenore | 340/551 |
| 4,170,759 | 10/1979 | Stimple et al. | 325/51 |
| 4,202,293 | 5/1980 | Gonda et al. | 119/29 |
| 4,255,816 | 3/1981 | Grunza et al. | 455/277 |
| 4,317,218 | 2/1982 | Perry | 455/54 |
| 4,317,229 | 2/1982 | Craig et al. | 455/277 |
| 4,335,682 | 6/1982 | Gonda et al. | 119/29 |
| 4,337,726 | 7/1982 | Czekajewski et al. | 119/1 |

(List continued on next page.)

FOREIGN PATENT DOCUMENTS

WO 94/02004  2/1994  WIPO.

OTHER PUBLICATIONS

Hausman, "An Analysis of Dual Diversity Receiving Systems" from Proceedings of the IRE, pp. 944—947, Jun. 1954.

(List continued on next page.)

Primary Examiner—Michael J. Carone
Assistant Examiner—James S. Bergin
Attorney, Agent, or Firm—Choate, Hall & Stewart

[57] ABSTRACT

An apparatus and method for training an animal and confining the animal to a defined area includes a magnetically actuated switch. The apparatus further includes a housing removably attached to the animal and a transducer mounted to the housing for delivering a stimulus to the animal. The magnetically actuated switch is disposed within the housing and is coupled to the transducer. The magnetically actuated switch is used for controlling at least one of a type of stimulus delivered by the transducer to the animal, a rate of stimulus delivered by the transducer to the animal, and an intensity of stimulus delivered by the transducer to the animal.

26 Claims, 7 Drawing Sheets

U.S. PATENT DOCUMENTS

| | | | |
|---|---|---|---|
| 4,538,153 | 8/1985 | Taga | 343/700 MS |
| 4,539,937 | 9/1985 | Workman | 119/29 |
| 4,551,727 | 11/1985 | Cunningham | 343/418 |
| 4,566,133 | 1/1986 | Rambo | 455/277 |
| 4,584,709 | 4/1986 | Kneisel et al. | 455/78 |
| 4,584,713 | 4/1986 | Bruckert et al. | 455/277 |
| 4,641,366 | 2/1987 | Yokoyama et al. | 455/89 |
| 4,696,058 | 9/1987 | Tachita et al. | 455/277 |
| 4,742,568 | 5/1988 | Furuya | 455/277 |
| 4,745,882 | 5/1988 | Yarnall, Sr. et al. | 119/29 |
| 4,765,276 | 8/1988 | Kime | 119/29 |
| 4,766,847 | 8/1988 | Venczel et al. | 119/29 |
| 4,803,447 | 2/1989 | Schultz et al. | 333/103 |
| 4,818,998 | 4/1989 | Apsell et al. | 342/44 |
| 4,823,398 | 4/1989 | Hashimoto | 455/134 |
| 4,864,642 | 9/1989 | Ueno et al. | 455/277 |
| 4,887,549 | 12/1989 | Powell | 119/29 |
| 4,898,120 | 2/1990 | Brose | 119/29 |
| 4,955,038 | 9/1990 | Lee et al. | 375/35 |
| 4,967,695 | 11/1990 | Giunta | 119/29 |
| 4,969,418 | 11/1990 | Jones | 119/29 |
| 4,996,945 | 3/1991 | Dix, Jr. | 119/29 |
| 5,046,453 | 9/1991 | Vinci | 119/29 |
| 5,053,768 | 10/1991 | Dix, Jr. | 340/988 |
| 5,054,428 | 10/1991 | Farkus | 119/29 |
| 5,065,449 | 11/1991 | Gordon et al. | 455/15 |
| 5,067,441 | 11/1991 | Weinstein | 119/721 |
| 5,068,642 | 11/1991 | Hruby et al. | 340/562 |
| 5,109,536 | 4/1992 | Kommrusch | 455/82 |
| 5,121,711 | 6/1992 | Aine | 119/29 |
| 5,138,328 | 8/1992 | Zibrik et al. | 343/702 |
| 5,161,485 | 11/1992 | McDade | 119/106 |
| 5,168,574 | 12/1992 | Gordon et al. | 455/9 |
| 5,170,149 | 12/1992 | Yarnall, Sr. et al. | 340/573 |
| 5,203,023 | 4/1993 | Saito et al. | 455/133 |
| 5,207,178 | 5/1993 | McDade et al. | 119/29 |
| 5,329,555 | 7/1994 | Marko et al. | 375/100 |
| 5,335,010 | 8/1994 | Lindemeier et al. | 348/706 |
| 5,353,744 | 10/1994 | Custer | 119/719 |
| 5,373,300 | 12/1994 | Jenness et al. | 343/102 |
| 5,425,330 | 6/1995 | Touchton et al. | 119/721 |
| 5,430,769 | 7/1995 | Patsiokas et al. | 375/347 |
| 5,435,271 | 7/1995 | Touchton et al. | 119/721 |
| 5,445,900 | 8/1995 | Miller, Jr. et al. | 429/1 |
| 5,446,922 | 8/1995 | Siwiak et al. | 455/277.2 |
| 5,460,124 | 10/1995 | Grimsley et al. | 119/721 |
| 5,465,687 | 11/1995 | Custer | 119/719 |
| 5,476,729 | 12/1995 | Miller, Jr. et al. | 429/1 |
| 5,533,469 | 7/1996 | Touchton et al. | 119/721 |
| 5,559,498 | 9/1996 | Westrick et al. | 340/573 |
| 5,561,673 | 10/1996 | Takai et al. | 371/5.5 |
| 5,570,655 | 11/1996 | Targa | 119/51.02 |
| 5,576,694 | 11/1996 | Touchton et al. | 340/573 |
| 5,682,839 | 11/1997 | Grimsley et al. | 119/721 |
| 5,799,618 | 9/1998 | Van Curen et al. | 119/721 |
| 5,808,551 | 9/1998 | Yarnall, Jr. et al. | 340/573 |
| 5,820,441 | 10/1998 | Pracas | 446/354 |

OTHER PUBLICATIONS

Brennen, "Linear Diversity Combining Techniques" from Proceedings of the IRE, pp. 1075–1102, Jun. 1959.

Air Force Technical Manual (1963), 52–8 vol. II, pp. 13–17 through 13–18.

Jakes, "A Comparison of Specific Space Diversity Techniques for Reduction of Fast Fading in UHF Mobile Radio Systems" from IEEE Transactions on Vehicular Technology, vol. VT–20, No. 4, Nov. 1971, pp. 81–92.

Rustako, Jr., "Performance of Feedback and Switch Space Diversity 900 MHz FM Mobile Radio Systems with Rayleigh Fading" from IEEE Transactions on Communications, vol. COM–21, No. 11, Nov. 1973, pp. 1257–1268.

Shortall, "A Switched Diversity Receiving System for Mobile Radio" from IEEE Transactions on Communications, vol. COM–21, No. 11, Nov. 1973, pp. 1269–1275.

Parsons et al., "Diversity Techniques for Mobile Radio Reception" from IEEE Transactions on Vehicular Technology, vol. VT–25, No. 3, Aug. 1976, pp. 75—85.

Cox, "Antenna Diversity Performance in Mitigating the Effects of Portable Radiotelephone Orientation and Multipath Propagation" from IEEE Transactions on Communications, vol. COM–31, No. 5, May 1983 pp. 620–628.

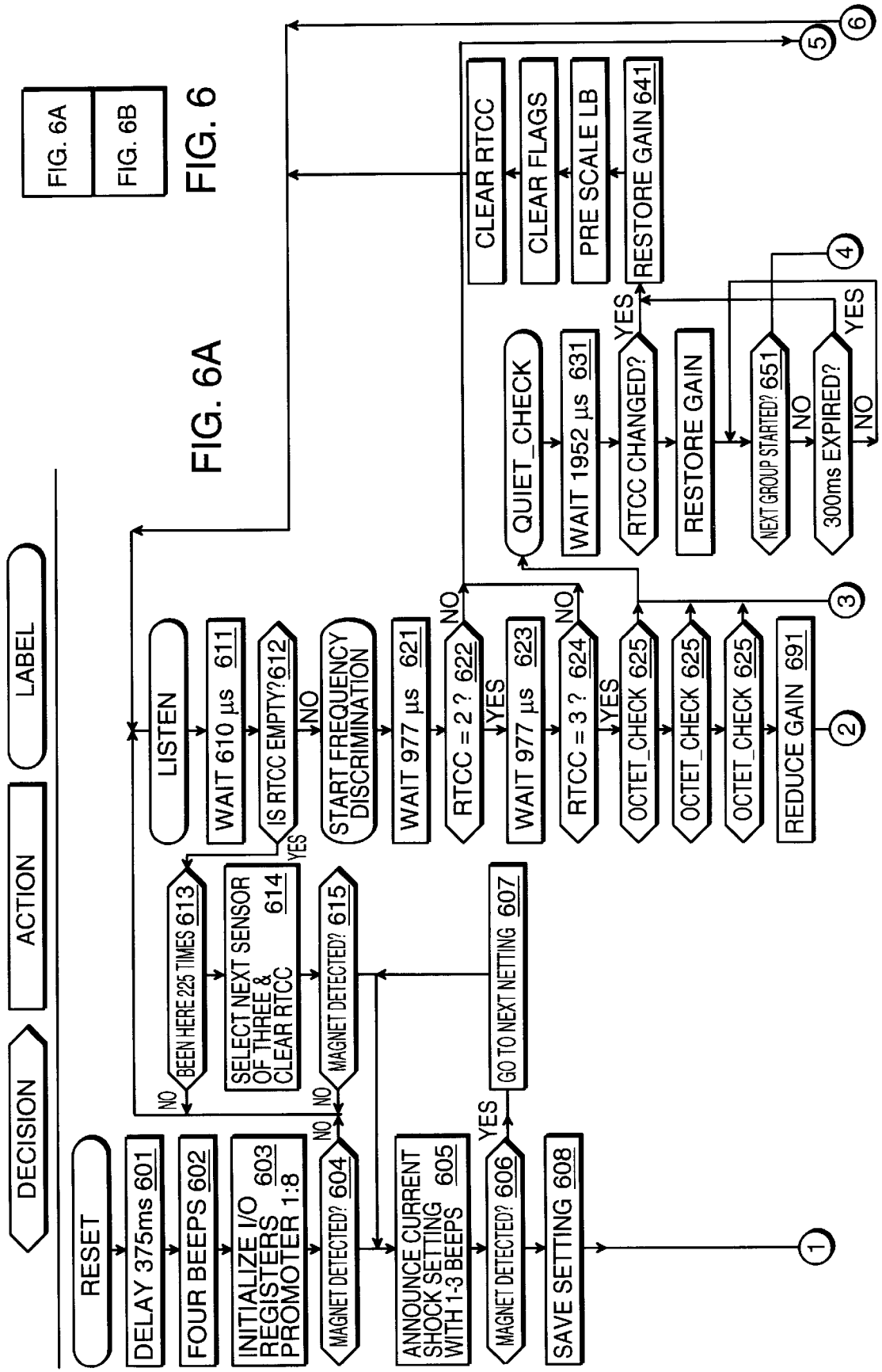

ANIMAL TRAINING APPARATUS AND METHOD

BACKGROUND OF THE INVENTION

This invention relates to an apparatus and method for training an animal, especially a dog, by providing a stimulus to discourage undesired behavior. The invention relates, more particularly, to providing an adjustable stimulus that trains the animal to limit its movement to a prescribed area.

One known technique to discourage a dog (or other animal) from leaving the confines of a yard or field is to attach a collar that delivers an aversive stimulus whenever the dog comes into range of a low-power radio signal broadcast along the perimeter of the yard. That signal can be generated, for example, by a wire "antenna" buried along the perimeter of the yard that is powered by a transmitter, e.g., in the owner's home. A receiver in the collar detects the signal as the dog approaches the perimeter wire and applies, e.g., a mild electric shock or olfactory irritant (such as ammonia gas) to discourage further progress. This can be preceded by a buzzing sound or other auditory warning. In time, the dog learns to turn back simply on hearing the auditory warning and without receiving other stimulus.

One difficulty encountered with the foregoing is radio frequency interference from other sources which may induce the aversive stimulus even when the dog is far from the perimeter, thereby confusing the animal and compromising the effectiveness of the technique. A solution to this problem involves transmitting a coded radio signal, as disclosed in commonly assigned U.S. Pat. No. 5,353,744, to Custer, incorporated by reference herein.

Another difficulty in the technique described above is controlling the parameters of delivery of the stimulus. For instance, it is known that providing different types of stimulus (e.g., shock and/or noise), different rates of stimulus (e.g., frequency of stimulus application) and different intensities of stimulus (e.g., voltage of the stimulus) enhances training efficiency and efficacy. It is likewise known that different animals respond differently to different stimulus types, rates and intensities. For example, a large dog or a dog with an unusual temperament may require a greater stimulus than a small dog or a dog with an average temperament.

Although a user can control certain stimulus parameters by altering the radio signal, this can be problematic since the transmitter is normally located in the owner's residence, some distance away from where the animal is being trained. The owner hardly wants to leave the animal to modify the stimulus parameters every time it is desirable to so. Besides the inconvenience, interrupting the training session may also confuse the animal and make training more difficult.

Environmental conditions present other difficulties. Because the animal may be out frolicking in rain or snow, the collar—and, particularly, its receiver unit—may be subjected to water, wind, mud, dirt, heat and cold. In addition, the receiver may be subjected to physical abuse, if the animal paws at it or rubs it against a tree or rock.

In view of the foregoing, an object of the invention is to provide improved apparatus and methods for training an animal and, more particularly, training a dog or other domesticated beast.

Yet another object of the invention is to provide such apparatus and methods as permit the ready adjustment of stimulus provided to an animal through a collar or other attached device.

Yet another object of the invention is to provide such apparatus and methods as improve the tailored delivery of stimulus to the animal.

Yet still another object of the invention is to provide such apparatus and methods as can be implemented inexpensively.

Yet still a further object of the invention is to provide such apparatus and methods as can be implemented in a rugged and waterproof housing.

SUMMARY OF THE INVENTION

The foregoing objects are among those attained by the invention, which provides in one aspect an apparatus to aid in training an animal. The apparatus includes a housing removably attached to the animal, a transducer mounted to the housing for delivering a stimulus to the animal, and a magnetically actuated switch disposed within the housing. The switch is coupled to the transducer and controls at least one of a type, a rate, and/or an intensity of stimulus delivered by the transducer to the animal.

In a further aspect of the invention, the apparatus also includes a magnet, external to the housing, for actuating the switch. A user actuates the switch by placing the magnet within a reaction zone of the switch and, thereby, generates a command.

A controller, coupled to the switch and to the transducer, interprets that command, e.g., based upon the time period that the switch is actuated. In an alternative aspect, the controller interprets the command based upon the number of times the user actuates the switch by repetitively disposing the magnet within, and removing the magnet from, the reaction zone.

In another aspect, the apparatus further includes a receiver coupled to the controller for receiving a coded radio signal. The radio signal activates delivery of the stimulus to the animal. The radio signal may include commands interpreted by the controller for further controlling any of the type, rate and intensity of stimulus delivered by the transducer to the animal. The controller may include adjustable sensitivity circuitry for defining a threshold strength of the coded radio signal below which delivery of the stimulus is prevented. A transmitter may be provided for generating the coded radio signal through an antenna defining a boundary over which the animal is trained not to cross.

The transducer may include, in still further aspects of the invention, a plurality of electrodes in contact with the animal and the type of stimulus includes an electric shock transmitted through the plurality of electrodes. The transducer also includes a speaker and the type of stimulus includes a noise transmitted through the speaker.

Another aspect of the invention provides an apparatus as described above that includes a watertight housing and a battery mounted to the housing and coupled to the controller for supplying power to the apparatus. The housing further includes a battery cavity and the cavity is sealed with a removable watertight battery cap.

Still further aspects of the invention provide methods for operating an apparatus of the type described above in order to train an animal.

These and other aspects of the invention are evident in the drawings and in the description that follows.

DETAILED DESCRIPTION

Introduction

The animal training apparatus of the present invention includes a receiver unit, carried by an animal, that delivers an aversive stimulus to the animal whenever the receiver unit detects a coded radio signal in a field surrounding a boundary wire extending from a transmitter. Signal generating circuitry of the transmitter sends a coded AM radio signal through the boundary wire which operates as a transmitting antenna.

As long as the transmitter power is on, the coded radio signal is continuously sent through the boundary wire setting up a continuous coded field in the vicinity of the wire. The system may thereafter be left unattended. The space established by the field within a threshold distance from the wire provides an avoidance zone for the animal. The receiver unit delivers the aversive stimulus to the animal whenever the animal is within the avoidance zone, and ceases delivering the aversive stimulus when the animal moves back within the prescribed space to escape the avoidance zone.

In the illustrated embodiment, as described in more detail below, certain operating parameters may be controllably selected by a user. These operating parameters include the type, rate and intensity of stimulus delivered to the animal. In these embodiments, the receiver unit is capable of delivering an audible signal alone, an electric shock alone, or an audible signal followed shortly by an electric shock. In other embodiments the rate and intensity of stimulus are controllable locally at the receiver unit. Also, the configuration of the signal sent by the transmitter circuitry through the boundary wire can be selected to provide the operating parameters of the receiver unit. The range of the field (and, hence the size of the avoidance zone) can be adjusted to increase or decrease the distance from the boundary wire at which a threshold for detection by the receiver unit is reached.

Local control of the receiver unit is provided via a switch or switches that allow the operating parameters to be selected proximate to the animal. Again, these operating parameters include type, rate and intensity of stimulus. Furthermore, the switch can be used to control the on/off status of the receiver unit. The switch is actuated when a user brings a magnet within a switch actuation zone outside the receiver unit. This prevents the waterproof housing and/or other environment-resistive features of the receiver unit from being compromised.

General

Figure 1A:
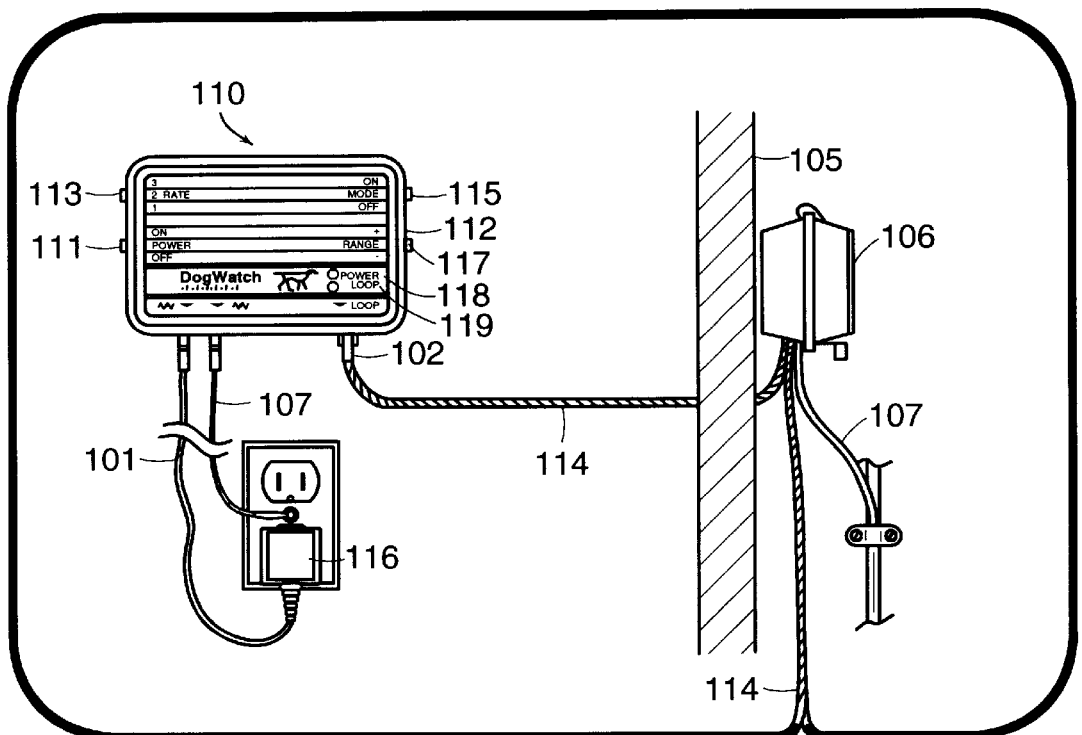
FIGS. 1A and 1B are drawings in perspective view of animal control apparatus including a transmitter and a receiver unit according to the present invention.
Figure 1B:
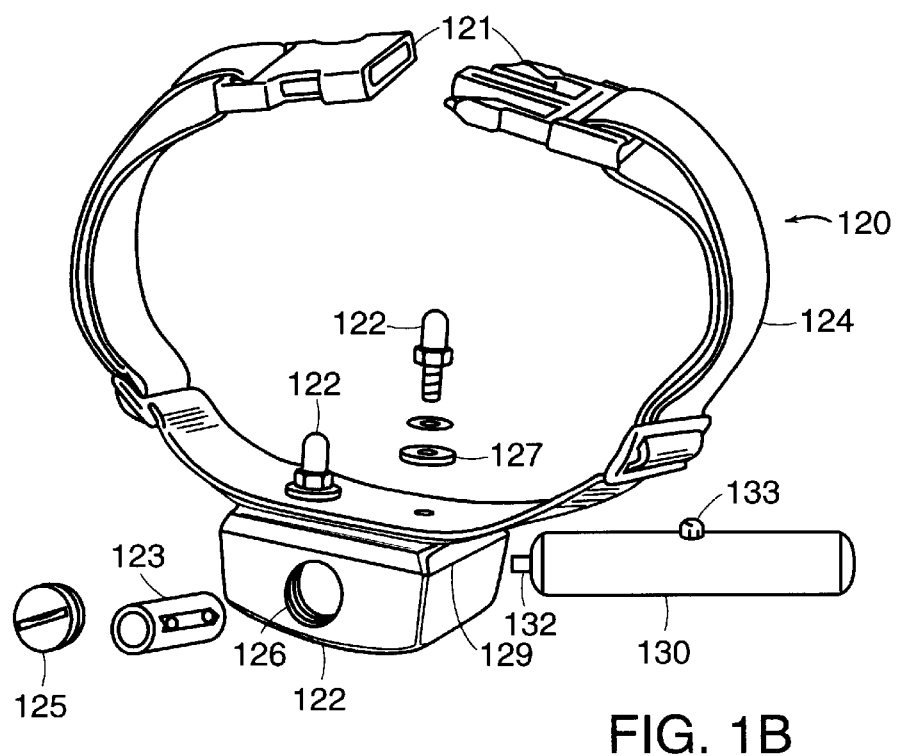

Referring to FIGS. 1A and 1B, the apparatus includes a transmitter, shown generally at 110 (FIG. 1A), and a receiver unit, shown generally at 120 (FIG. 1B).

As seen in FIG. 1A, transmitter 110 includes electronic circuitry contained in an enclosure 112, which supplies bursts of approximately 8 kHz pulses to a twisted wire, shown at 114 leading away from enclosure 112. The transmitter 110 is typically mounted on a wall indoors to protect it from the elements. The twisted wire 114 is fed through an outside wall 105 to a surge protector 106 which protects the transmitter from electrical surges, especially due to lightning. The surge protector 106 and the transmitter 110 are grounded by grounding wire 107.

The transmitter 110 is provided with a standard alternating current adapter 1 16 so that it can be powered by connection to a standard 110 volt outlet. The A/C adapter 116 is provided with a plug 101 for connection to a power supply jack on the transmitter enclosure 112. Twisted wire 114 is provided at its end with a plug 102 for connection to a wire jack on the transmitter enclosure. The twisted wire 114 leads from plug 102 to a boundary portion of the wire (shown figuratively at 302 in FIG. 1A). The boundary portion of the wire 302 is arranged on the periphery of the space within which the animal is to be confined (or from which the animal is to be excluded), establishing the boundary of the prescribed space.

The transmitter enclosure 112 is provided with a power source on/off switch 111; a shock stimulation rate selector switch 113, which provides for delivery to the animal of either slow or medium or fast shock rates; a type of stimulus selector switch 115, which provides for delivery to the animal (in the "audible-plus-shock" mode) of an audible warning followed by an electric shock stimulation or (in the "audible-only" mode) of an audible warning only; and a range adjuster 117, which provides for adjustment of the strength of the signal field, to increase or decrease the effective width of the avoidance zone.

The width of the avoidance zone can be readily adjusted to distances between about 3 and 12 feet by turning the range adjuster 117 in one direction ("+") to widen the signal field, and in another direction ("−") to narrow it. The range adjuster 117 basically increases the current in the wire 302.

A power indicator light 118 on the front panel of the transmitter enclosure lights when the transmitter is correctly connected to line current through the A/C adapter, the on/off switch is "on", and power is operational.

When the transmitter 110 is connected to a power source and the power source on/off switch 111 is "on", a signal consisting of a series of bursts of pulses, whose parameters can be set (as described below with reference to FIG. 2) using the selectors 113, 115, 117, is continually delivered through the boundary wire, which acts as a transmitting antenna to produce a continuously amplitude-modulated field about the boundary wire 302. Once the boundary wire has been properly installed and plugged into the transmitter, and so long as there is electrical continuity throughout the boundary wire, a loop indicator light 119 lights; if electrical continuity in the boundary wire is broken or if the signal is interrupted, the loop indicator light goes out and an audible alarm sounds.

Turning now to FIG. 1B, the receiver unit 120 includes electronic circuitry contained in a housing 122, which is affixed to a length-adjustable strap 124. The strap 124 is provided with a clasp or buckle 121, so that the receiver unit 120 can be removably mounted onto the animal by encircling the animal's neck with the strap, adjusting the length, and joining the clasp. Electrodes 128 protrude from receiver unit housing 122 so that when the receiver unit 120 is mounted on the animal, the electrodes 128 press against the animal's skin to deliver a shock stimulus to the animal upon activation by the circuitry. Electrodes 128 of different lengths which are readily interchangeable may be used to compensate for the thickness of the animal's fur. Receiver unit 120 is additionally provided with a small loudspeaker (not shown in FIG. 1B) to deliver an auditory stimulus to the animal. The receiver unit is powered by a replaceable battery pack 123, which is received in a battery compartment 126 and held in place by battery cap 125.

The receiver unit housing 122 is preferably watertight and made of material sufficiently rugged to withstand various outdoor environments. The battery cap 125 is threaded and may include a gasket or other sealant (not shown) to provide a watertight enclosure for the battery pack 123. The electrodes 128 are threadably mounted to the housing and include a washer 127 to keep moisture and dirt outside the housing 122.

The receiver unit 120 includes a magnetically actuated switch (not shown in FIG. 1B, but described in greater detail below), preferably located within the housing 122 near a side 129 of the housing.

An actuator 130 includes a magnet 132 at an end thereof and a test light 133 (the test light is more fully described below). When a user places the magnet 132 outside the housing 122 within an "actuation zone" (e.g., 0"–0.5" and, preferably, 0"–2") of the magnetic switch (located near side 129), the magnet 132 will actuate the switch. Thus, the user can locally and externally control operating parameters of the receiver unit 120 by giving commands to the receiver unit by actuating the switch. Furthermore, no additional waterproofing of the housing 122 is required to implement this local control feature.

A user enters commands into the receiver unit by moving the magnet 132 in and out of the actuation zone one or more successive times. As the magnet 132 is placed in that zone, circuitry within the receiver unit 120 measures the period of time during which it actuates the switch. Based upon this time period, certain operating parameters may be set. For example, by placing the magnet in the actuation zone for one second, the receiver unit enters an operational state wherein it will deliver a low intensity stimulus to the animal when it enters the avoidance zone. If the user keeps the magnet near the switch for another second, the receiver unit enters a state wherein a medium intensity level will be delivered to the animal. Another second of actuation will cause the receiver unit to enter a state wherein a high intensity level of stimulus will be delivered. Other series of commands are possible and described more fully below. The receiver unit emits a beep or series of beeps from a speaker to indicate to the user which particular operating parameters have been set.

As the animal enters the avoidance zone, a receiver within the receiver unit 120 detects the field generated about the boundary wire 302. Circuitry within the receiver unit processes the radio signal from the boundary wire to produce appropriate stimuli based upon the commands input from the magnetically actuated switch and the transmitter. For example, when the shock stimulation rate is adjusted to a higher setting using selector switch 113 on the transmitter, the animal receives a greater number of shocks per second. As explained below, the magnet and magnetically actuated switch can also be used to set the stimulation rate, as well as the intensity of stimulus, i.e., the voltage level.

The type selector switch 115 on the transmitter is used to set the type of stimulus, i.e., audible-only or audible-plus-shock. In preferred embodiments, the magnet and magnet switch can be used to set this as well.

A further feature of the receiver unit includes a warning zone before the avoidance zone.

Such a warning zone extends up to an additional five to ten feet from the avoidance zone. When the animal enters the warning zone, only an auditory signal is delivered. If the animal continues beyond the warning zone, however, and proceeds into the avoidance zone, a shock may be delivered. In order for the apparatus of the present invention to provide a warning zone, the controller unit includes circuitry that, upon initial detection of the radio signal, decreases the threshold sensitivity of the controller by some amount, preferably about 5–20%. If the threshold sensitivity reduction prevents the controller from subsequently detecting the radio signal, then the controller concludes that the animal is in the warning zone and provides a warning noise. If instead the controller still detects the radio signal even after the threshold is lowered, then the controller concludes that the animal is in the avoidance zone and provides a shock stimulus. The threshold is reset to normal after the stimulus is delivered.

Stimulus Parameters

Delivery of stimulatory impulses is according to three parameters referred to generally as type, rate and intensity. Preferred apparatus according to the invention delivers aversive stimulation to the animal in a series of stimulatory impulses (auditory "beeps" and/or electric shocks) that continue as long as the animal remains within the avoidance zone, and ceases when the animal leaves the avoidance zone.

The type of stimulus delivered to the animal can include electric shock, audible signals and/or an irritant such as ammonia gas. Preferred apparatus according to the invention is capable of delivering an auditory stimulation (a series of "beeps" audible to the animal) alone, or an auditory stimulation coupled with an electric shock stimulation, in which each of the series of audible beeps is followed by an electric shock.

The rate of stimulus delivered to the animal is the number of stimulatory impulses per second. The stimulus becomes more aversive as the rate of stimulus delivery is increased. A higher rate produces a "stronger" aversive stimulation, and delivery of stimulatory impulses at a lower rate produces a "weaker" aversive stimulation. Apparatus according to the present invention is capable of delivering any rate, but it is preferred to use three different rates of stimulation, low (about 10 bursts per second), medium (about 32 bursts per second) and high (about 56 bursts per second).

The intensity of stimulus delivered to the animal corresponds to the magnitude of the stimulus. In other words, and with respect to an electric shock type of stimulus, the intensity is directly related to the voltage of the shock delivered to the animal. Again, the apparatus of the present invention is capable of delivering virtually any intensity of stimulus, but three settings of electric shock are preferred, low (about 2000 volts), medium (about 3500 volts) and high (about 5000 volts).

Moreover, whatever the type, rate or intensity of aversive stimulus delivered, apparatus according to the invention is capable of arresting or interrupting the delivery of the stimulus whenever the receiver detects that an incoming signal is not a signal characteristic of the coded transmission signal. In particular, preferred apparatus disables delivery of the aversive stimulus after the first stimulatory burst whenever the incoming signal has a duration longer than a set maximum burst duration. Because most interfering radio frequency signals that are commonly encountered in the domestic setting are effectively continuous-wave, aversive stimulation (beyond the initial beep or shock) resulting from the animal's proximity to sources other than the boundary wire is thereby avoided.

Figure 2:
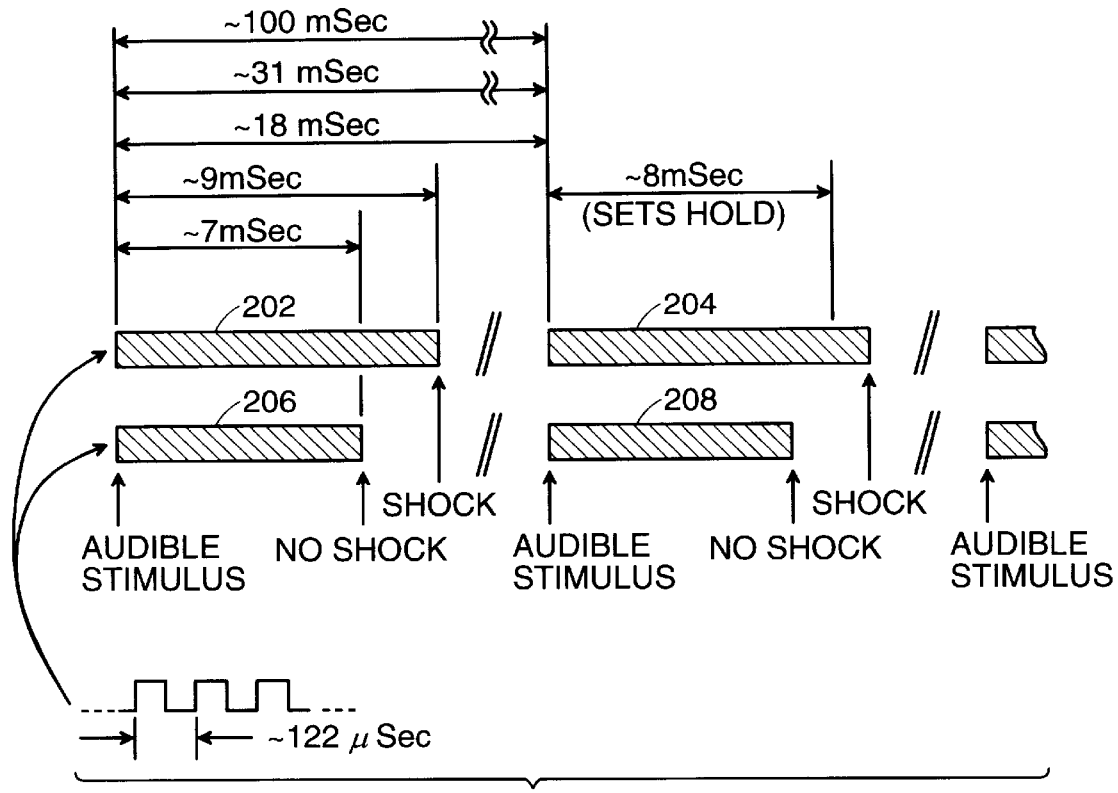
FIG. 2 is a graphical representation of electrical stimulation regimes according to the present invention.

FIG. 2 illustrates a coded radio signal that can be generated by the transmitter circuitry illustrated in FIG. 3, described in detail below. FIG. 2 shows, on a time line running from left to right, two successive bursts of pulses received at the receiver antenna above the threshold when the transmitter is set in an audible-plus-shock mode (bursts 202, 204) and in an audible-only mode (bursts 206, 208). Bursts 202 and 206 may be the initial bursts received above threshold; that is, they may be the first bursts received as the animal crosses into the avoidance zone, and further bursts above threshold beyond those shown here will be received until the animal leaves the avoidance zone and the signal falls below the threshold.

Figure 3:
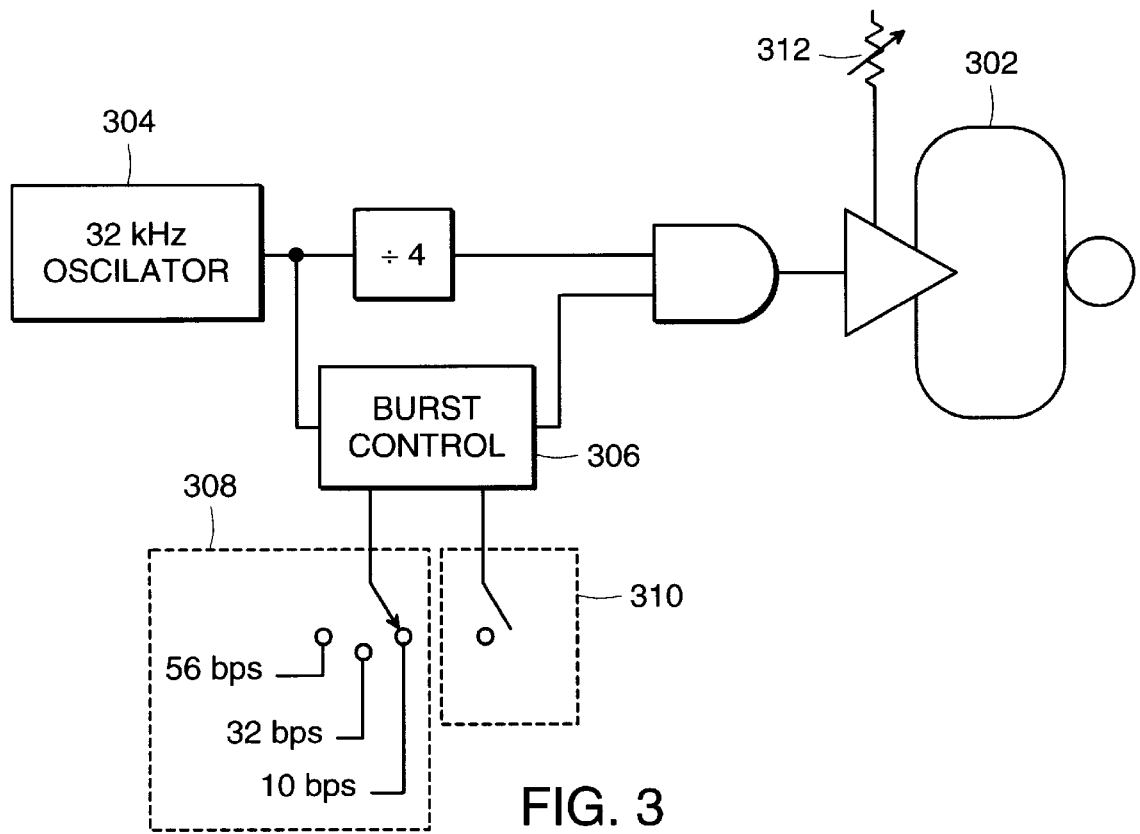
FIG. 3 is a block diagram showing the electronic operation of the transmitter of the apparatus of FIG. 1A.

Each burst is an envelope of pulses having a period of about 122 μsec (in the circuitry shown in FIG. 3 the frequency is slightly higher than 8 kHz, as the oscillator divides a standard watch crystal oscillation (about 32.768 kHz) by four). In the embodiment shown, bursts 206, 208 have a length of about 7 msec in the audible-only mode; and bursts 202, 204 have a length of about 9 msec in the audible-plus-shock mode.

The burst frequency (which is directly related to the rate of stimulus delivery) may be set to send the bursts at intervals of about 100 msec (in the "slow" repetition rate setting), or about 31 msec (in the "medium" repetition rate setting), or about 18 msec (in the "fast" repetition rate setting). As the receiver unit detects the initiation of an incoming signal above threshold, the receiver unit circuitry causes an audible beep to be produced by the loudspeaker; thereafter, in the audible-only mode, the coded burst ceases at a burst length of about 7 msec, and no shock stimulation is delivered. After the repetition rate interval has passed (100 msec, 31 msec, or 18 msec), if the animal has not yet escaped the avoidance zone, a subsequent coded burst will be detected and the receiver circuitry will cause another audible beep. The receiver will in this way continue to deliver a series of audible beeps until the animal leaves the avoidance zone and the received signal falls below threshold, and then the stimulation will cease.

In the audible-plus-shock mode, each coded burst continues for about 9 msec, and the receiver responds to such longer bursts by delivering a shock to the animal following each audible beep. In one embodiment, the delivery of the shock will occur at every other coded burst (or 200 msec, 61 msec, or 36 msec (depending on the repetition rate setting)) until the animal leaves the avoidance zone.

If, on the other hand, a signal is received above threshold that substantially exceeds the audible-plus-shock mode burst length (as may occur when the animal approaches close enough to an interfering source that generates an effectively continuous-wave signal), an initial audible beep will be delivered as the signal first detected, followed (if the transmitter is set in audible-plus-shock mode) by an initial shock as the signal exceeds a duration of about 8 msec (initially seen by the receiver as an audible-plus-shock mode burst); but thereafter the receiver will recognize that the signal duration exceeds the maximum coded burst length (9 msec), and the circuitry will disable the stimulus delivery so that no further audible beep (or audible beep followed by shock) is delivered to the animal. Then, when the animal moves sufficiently far away from the interfering source that the signal falls below threshold, the system is reset, again enabled and ready to detect an incoming signal above threshold.

Illustrative circuitry that produces such stimulation regimes is described in further detail below, with reference to FIGS. 3–5B.

Transmitter Circuitry

Generally, the transmitter circuits send a coded AM signal through the boundary wire 302, generating a corresponding coded AM radio frequency field near the boundary wire. In preferred embodiments, the signal consists of a series of bursts of pulses; the rate of repetition of the bursts and the frequency of the pulses in the bursts (i.e. the frequency of the transmitted radio signal) and the length of the bursts can be selected, and the receiver delivers an aversive stimulus to the animal whose rate (frequency of stimulation) is related to the burst repetition rate and whose type (auditory or shock) is related to the burst length. The signal that is transmitted by the transmitter through the boundary wire 302 corresponds to the bursts of pulses (202 and 204, or 206 and 208) shown in FIG. 2.

Referring now to the block diagram of FIG. 3, the transmitter includes boundary wire 302, to be installed around the perimeter of the space within which the animal is to be confined, that acts as a transmitting antenna which is driven by circuitry that sends a coded signal through the wire. The transmitter circuitry includes an oscillator 304, burst control circuitry 306 controlled by burst repetition rate selector 308 (shown with three settings, 10 bursts per second ("bps"), 32 bps and 56 bps) and burst length selector 310 (as described above, may be either 7 msec for audible-only or 9 msec for audible-plus-shock); and field strength (wire current) adjustment means, indicated at 312.

Circuitry for generating the coded radio signal is known in the animal training industry. A detailed example of such circuitry is contained in U.S. Pat. No. 5,353,744 to Custer (see particularly FIGS. 5A, 5B and 5C and related text), which is incorporated herein by reference.

Receiver Circuitry

Generally, the receiver unit receives two inputs, one from the magnetically actuated switch and the other from the transmitter. The receiver unit includes receiver circuitry which detects and processes the commands provided by the magnetic switch and the radio signal.

Figure 4:
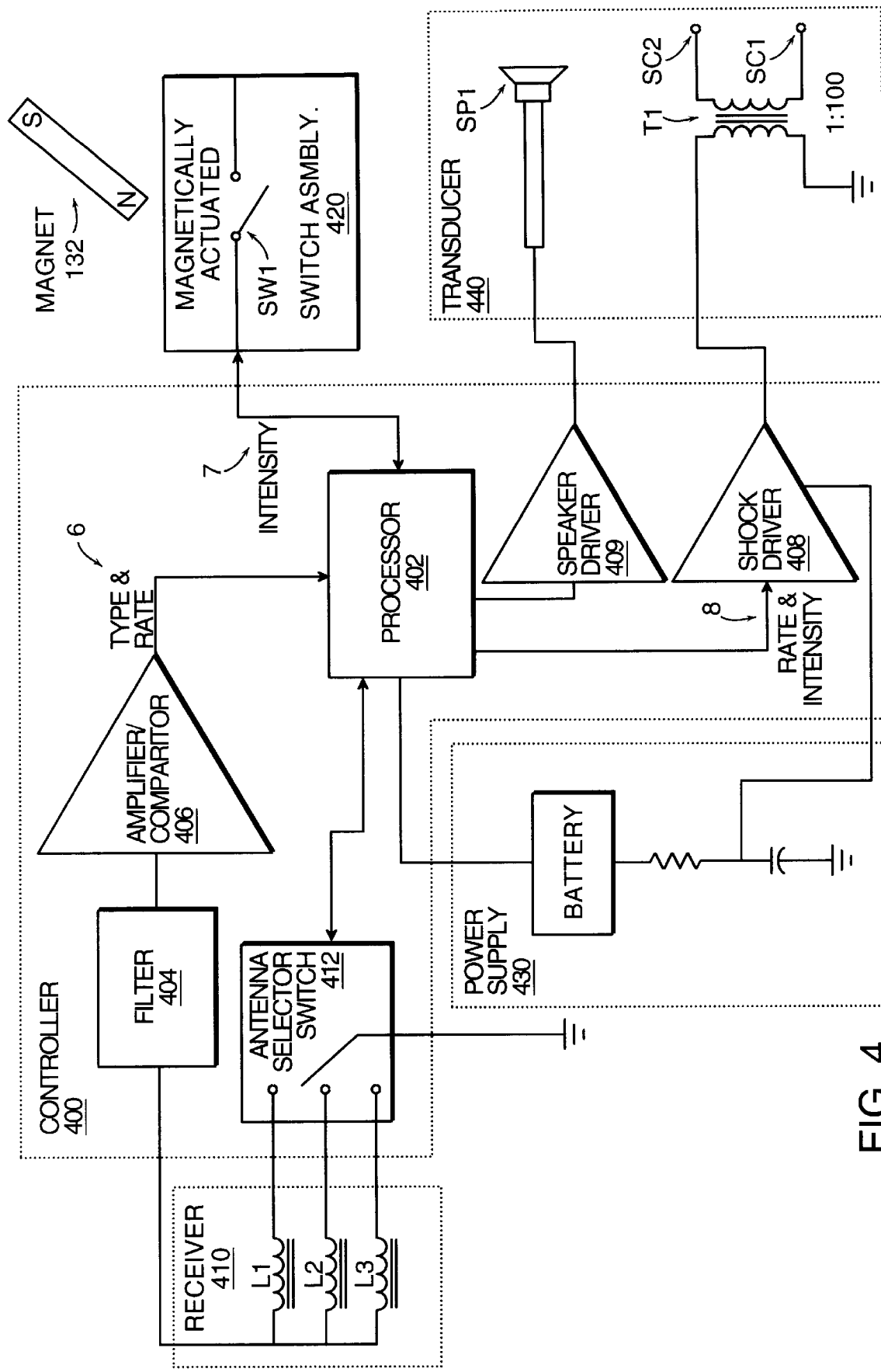
FIG. 4 is a block diagram showing the electronic operation of the receiver unit of the apparatus of FIG. IB.
Figure 5A:
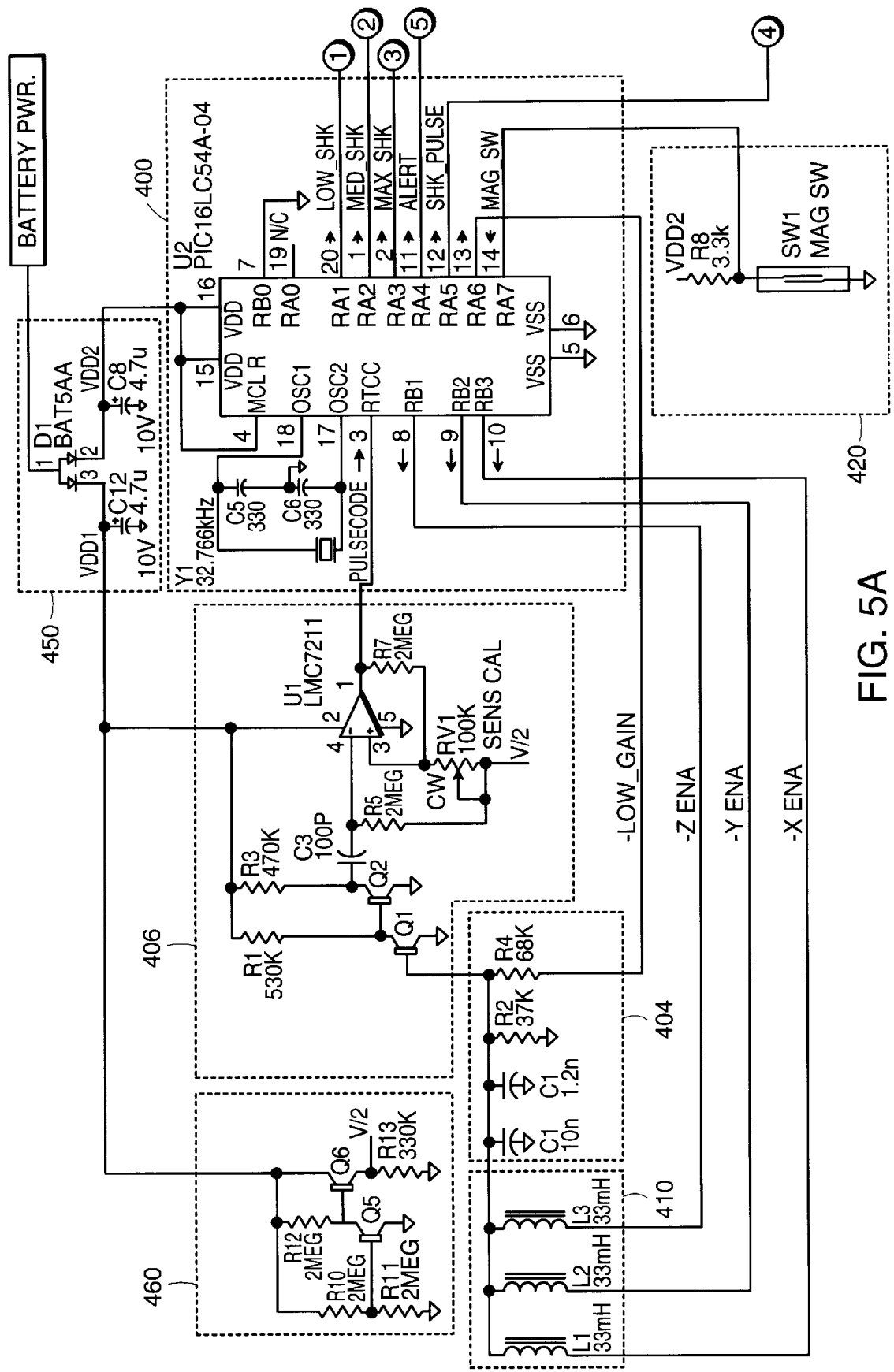
FIGS. 5A and 5B are a schematic of electronic circuitry of the receiver unit.
Figure 5B:
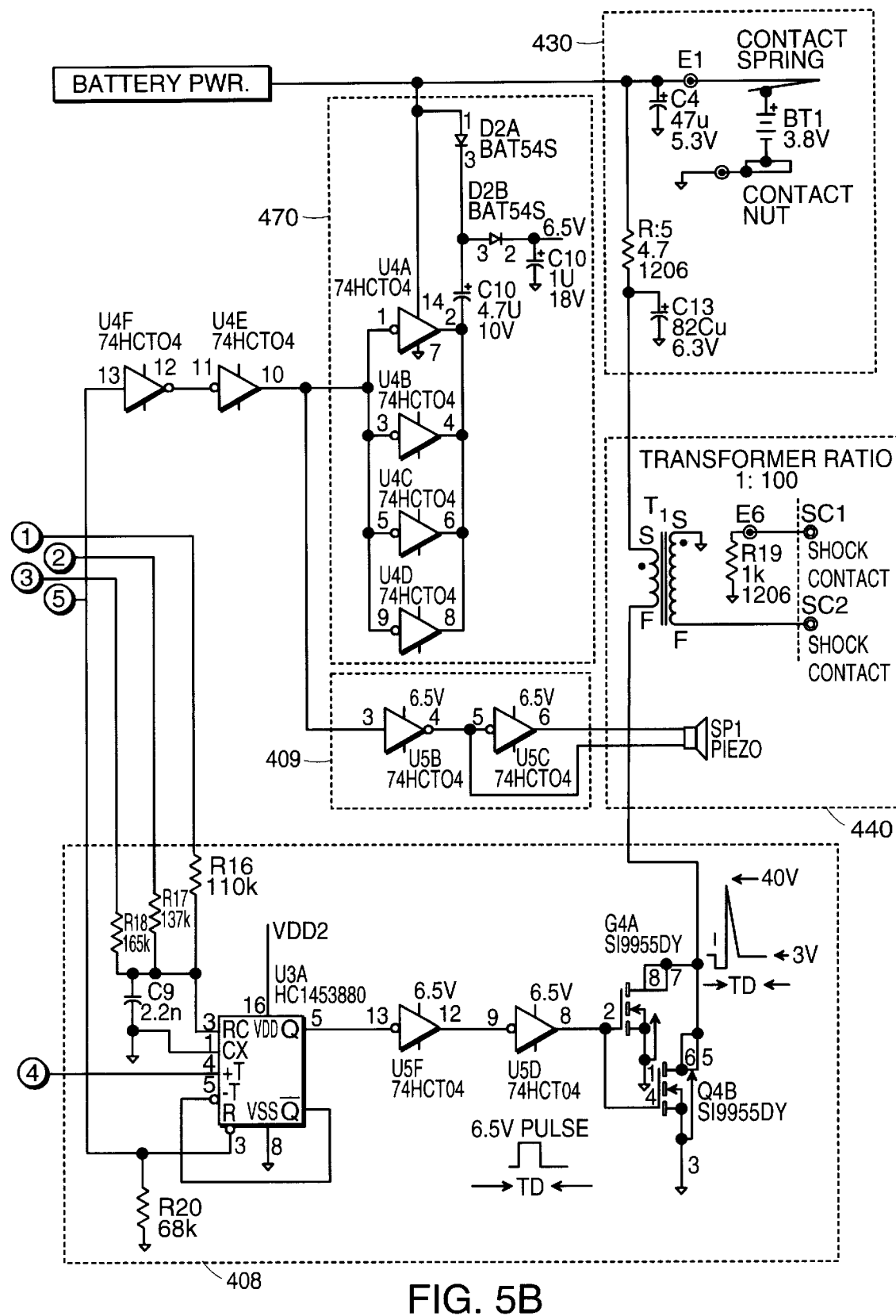

Shown in the block diagram of FIG. 4 and the detailed schematic of FIGS. 5A and 5B, is the circuitry contained within the receiver unit housing. The circuitry includes a power supply 430, a controller 400 and a transducer 440. Operation of the receiver unit is governed by the controller 400 which executes instructions defining the order and conditions under which the receiver unit circuitry activates components of the receiver unit. The controller 400 is connected to and operates the transducer 440 for applying stimulus to the animal when the animal enters the avoidance zone created by the radio signal broadcast from the boundary wire. The controller 400 includes a processor 402 and instructions may be stored in processor 402 or in a separate memory device (not shown). The power supply 430 contained within the receiver unit provides power to the controller and to the transducer 440 for delivery of the stimulus to the animal.

The receiver unit circuitry receives input from a switch assembly 420 and a receiver 410, each of which delivers commands to the controller 400.

The receiver 410 includes three mutually orthogonal antennae L1, L2 and L3, each arranged within the receiver unit along an x, y and z-axis. The antennae are connected to the controller 400 which processes the signals received by the antennae. The controller 400 includes a selector switch 412 to selectively and individually activate each of the three antennae L1, L2 and L3. The controller 400 further includes a tuned circuit such as a resonant amplifier or filter 404 whereby the receiver 410 is tuned to the desired transmitter frequency (preferably the frequency of the coded radio signal).

An amplifier and comparator 406 is included in the controller to receive the signal, if any, from the filter 404. If the strength of the signal from the filter 404 is greater than a predetermined threshold, the amplifier and comparator 406 provide a conditioned signal 6 to the processor 402. When the processor 402 detects the signal from the amplifier and comparator 406, the signal is tested to determine whether the signal is the coded radio signal from the transmitter.

One source of commands to the controller 400 is the switch assembly 420 which includes magnetically actuated switch SW1. Preferably, the switch SW1 is oriented near a side of the housing to readily permit actuation by the magnet located outside the housing. As described above, a user actuates the magnetically actuated switch SW1 by placing the magnet 132 within a zone of actuation of the switch. The controller 400 is connected to the switch SW1 such that when the switch is actuated it delivers a signal 7 to the processor 402. The processor includes a clock circuit which measures the length of time that the switch SW1 is actuated by a user. The processor 402 interprets the command from the switch based upon the length of time that the switch SW1 is actuated. Thus, the switch SW1 delivers a first command when the switch is activated for a first length of time, a second command when the switch is activated for a second length of time and so forth. The commands delivered by the switch to the processor 402 may include the type, rate and/or intensity of stimulus to be delivered by transducer 440 to the animal. Furthermore, the processor may include on/off circuitry (not shown) which is controllable by a command from the switch. In a preferred embodiment, switch SW1 delivers a signal 7 to processor 402 and the signal 7 is interpreted as a command by the controller 400 to set the intensity of stimulus to one of three voltage settings low (about 2000 volts), medium (about 3500 volts) and high (about 5000 volts).

The other input to the receiver unit circuitry is the receiver 410 which receives the radio signal from the boundary wire. In a preferred embodiment, the received and processed signal 6 includes two commands, namely the length of each burst (indicating the type of stimulus, e.g., audio-only or audio-plus-shock) and the rate of the burst transmission (indicating the rate of stimulus, e.g. low shock rate or high shock rate).

In preferred embodiments the processor 402 is capable at any given time of delivering any of a variety of stimulus types, in any range of rates and at any level of intensity. Commands to set these parameters may be from either the switch SW1 or the receiver 410 or a combination thereof.

The signal amplitude from the boundary wire determines whether the controller 400 responds to the signal by delivering an aversive stimulus to the animal. The amplitude of the receiver signal depends upon the strength of the current in the boundary wire and the distance between the boundary wire and the receiver 410; for a given boundary wire current value, if the amplitude is less than the set threshold amount, the amplifier and comparator 406 will prevent the processor 402 from delivering any stimulus to the animal.

The transducer 440 includes a transformer T1 and a speaker SP1. The transformer T1 preferably has primary to secondary winding ratio of 1:100. The secondary side of the transformer delivers the shock to the animal via shock contacts SC1, SC2. The speaker SP1 is a piezoelectric speaker connected to speaker driver 409 that delivers both the audio-type stimulus to the animal and the "beeps" to the user to indicate the command given at the switch. More than one speaker may be used to provide stimulus noises to the animal and/or "beeps" to the user.

A shock driver 408 is connected between the processor 402 and the transformer T1. In this embodiment, the shock driver 408 receives a rate signal and an intensity signal 8 from the processor 402. The shock driver delivers current and voltage from the power supply 430 (which includes a capacitor) to the transformer T1 based upon the rate signal and the intensity signal 8.

The detailed schematic of FIGS. 5A and 5B shows the receiver unit circuitry including controller 400, receiver 410, switch assembly 420, power supply 430 and transducer 440. Particular portions of the receiver unit circuitry will be pointed out as follows.

The amplifier and comparator 406 includes a variable resistor RV1 which can be set at the end of the manufacturing process to ensure that each receiver unit will have approximately the same threshold sensitivity. RV1 is set to control the reference voltage input to comparator U1.

The switch assembly 420 is connected to the processor 402 and includes the magnetically actuated switch SW1, preferably a reed switch (e.g., .5"–1.5" in length, with an actuation force of between 10–25 and, preferably, 15 ampere-turns) of the type commercially available in the marketplace, e.g., from the Hamlin Corporation, in series with R8 which is connected to voltage VDD2. When the switch SW1 is actuated, a signal is transmitted to the processor. In this example, the processor interprets the time period of the signal as a command for delivering either a low, medium or high shock intensity to the animal. Of course it should be readily appreciated that the switch SW1 could provide other commands by other methods to the processor. For instance, a command could be provided by repetitively moving the magnet in and out of the actuation range of the switch.

The processor 402 delivers five signals to the shock driver 408 indicated at 1, 2, 3, 4 and 5. Signals 1, 2 and 3 are low, medium and high shock signals, respectively, each of which initiates a correspondingly low, medium or high shock intensity at the shock driver 408 when delivered by processor 402. The command for the rate at which the shock is delivered is contained in signal 4. Signal 5 is an audio signal which is provided to both the shock driver 408 and the speaker driver 409 to control speaker SP1 output. The shock driver 408 can also deliver an audio signal to the speaker driver to provide the near simultaneous audible-plus-shock stimulus to the animal.

The remaining portions of the receiver unit circuitry include a supply isolation check valve 450 that isolates the power supply 430 from most of the circuitry in the receiver unit. Also included is a voltage reference circuit 460 which provides a reference voltage V/2 to other components in the receiver unit circuitry. A charge pump 470 converts the 3.6 volt power supply to about a 6.5 voltage source for the shock driver 408 and the speaker driver 409.

It will be apparent to those skilled in the art that a controller according to the present invention may have any of a number of different configurations. For example, the controller could be the processor alone which interprets commands from the switch and/or the receiver and then supplies signals to the transducer for delivery of stimulus based upon such commands. Also, the controller may include any or none of the remaining circuitry described above. By way of example, the shock driver could be included as part of the transducer or the antenna selector switch could be removed entirely from the apparatus.

Receiver Circuitry Flow Diagram

Figure 6B:
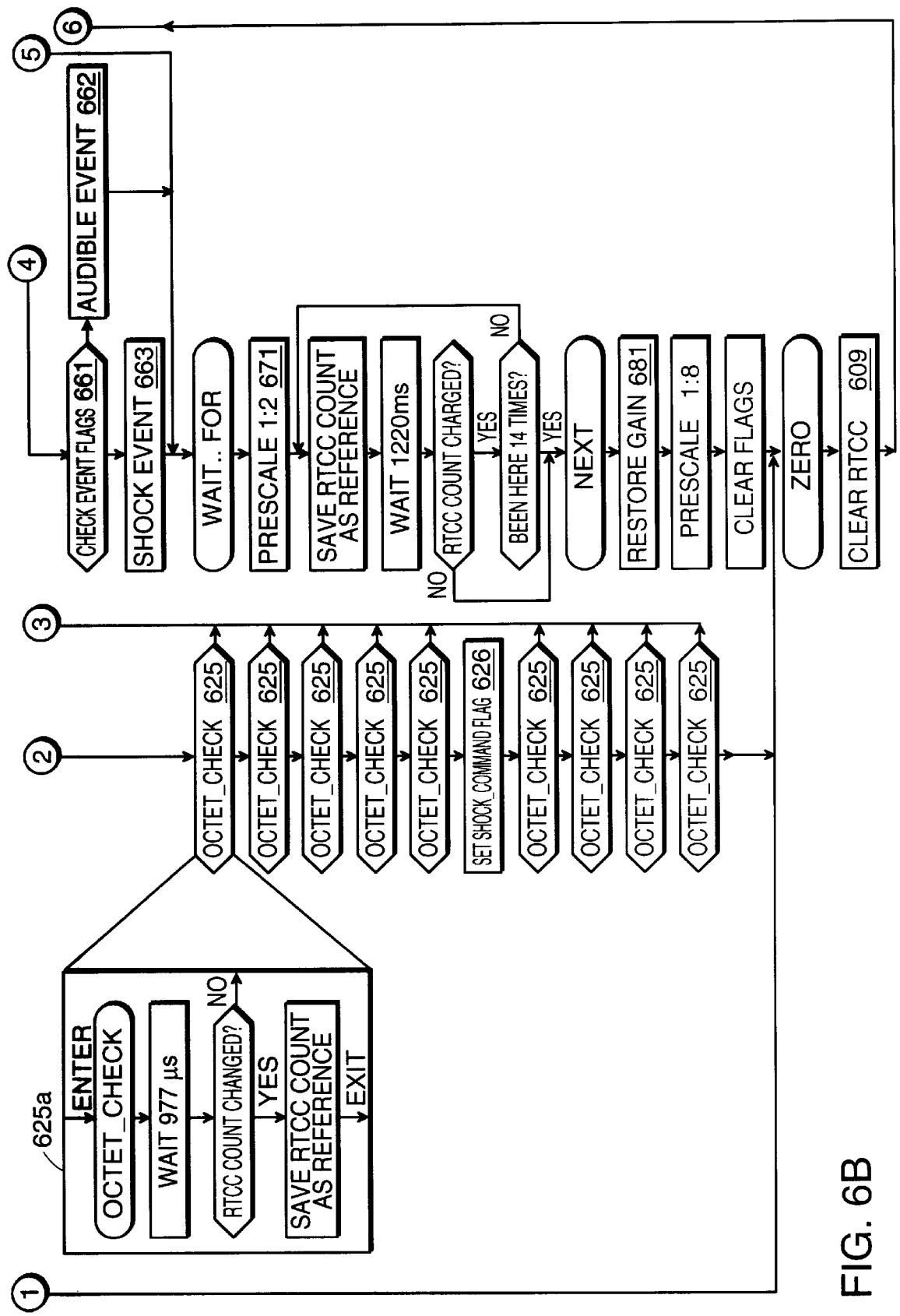
FIG. 6 is a flow diagram of procedures executed by the electronic circuitry shown schematically in FIGS. 5A and 5B.

FIG. 6 depicts a flow diagram of certain procedures executed by the controller and related circuitry of FIGS. 5A and 5B. These procedures comprise software code contained within the controller and/or a connected memory device. Those skilled in the art, of course, will recognize that countless variations of the procedures described below are possible.

The controller includes a real time clock counter ("RTCC"). The controller increments the RTCC each time the controller receives signal 6 (a "pulse") from the comparator 406 and each pulse indicates that the receiver 410 has detected a sufficiently strong signal at the desired frequency (see FIG. 4). The RTCC is clocked at approximately 8.192 kHz (32.768 kHz divided by four), the same as the transmitter. The controller includes a programmable prescaler value. The prescaler functions as a divisor; i.e., if the prescaler is set to 1:8, the controller needs to "see" 8 pulses before RTCC is incremented by one.

With reference to FIG. 6, block 601 begins the reset mode of the controller with a time delay. The reset mode occurs when the receiver unit is first powered. The reset mode emits four beeps at 602 to indicate to the user that the receiver unit is on and powered. The reset mode initializes I/O and initializes registers (including RTCC) and sets the prescaler to 1:8 at reference numeral 503.

At block 604, the controller looks for the presence of the magnet (described above) by checking actuation of switch SW1 (again, see FIG. 4). If the magnet is not present, the controller proceeds with a default, medium voltage intensity setting and moves to the listen mode beginning at 611. If, however, the magnet is detected, the controller is set to the high voltage setting and the controller emits three beeps at 605; magnet detection is again checked at 606. If the magnet is again detected, the controller is set to the low voltage setting and the controller emits one beep. The controller iterates through this loop (steps 605, 606 and 607), changing from low to medium to high voltage (and emitting related beeps), until the magnet is not detected by the controller.

Once the magnet is not detected at 606, the controller saves the voltage setting at 608 and enters the zeroing mode at 609 which clears the RTCC. The controller then enters to the listen mode beginning at 611.

The listen mode begins with a time delay at 611. At 612 the RTCC is checked to see if it is empty. If it is empty, then the coded radio signal was not detected by the receiver unit. The listen mode loops iteratively checking the RTCC for a value greater than 0. After a certain iteration time, at 613 the controller turns to a different one of the three mutually orthogonal antennas L1, L2, L3 (see FIG. 4) and again checks for magnet detection at 615. The magnet detection routine proceeds as described above.

If, at 612, the RTCC is not empty then the burst discrimination mode begins at 621. The burst discrimination mode verifies that the burst of pulses has the correct frequency and the correct length. The discrimination mode also determines whether the burst of pulses length corresponds to the audio-only or the audio-plus-shock stimulus.

At 621 the controller waits an period of time (preferably about 977 μsec) and at 622 the RTCC is checked to see if it has been incremented to "2". Steps 623 and 624 similarly wait and then check RTCC for the value "3". If these are the RTCC values, then the controller concludes that the pulses are occurring at the correct frequency, and proceeds to determine the length of the burst.

At 625 the controller repetitively checks to see if the RTCC has changed. If so, a pulse has been received (and thus the burst is continuing). Step 625a shows a blow-up of each 625 step. Upon eight consecutive 625 steps, the controller registers that the burst is greater than the "audible-only" burst length and sets a flag to "audible-plus-shock" at 626. If the RTCC is incremented four more consecutive times after the flag is set, then the burst is too long and the controller recognizes that the signal is not the desired signal and the system enters the zero mode at 609.

If the RTCC count does not change at any one of the 625 blocks, the controller enters the quiet-check mode at 631. This mode looks for the expected quiet time in the signal. If the expected quiet time is not present, no stimulus is delivered, the flags and RTCC are cleared beginning at 641, and the listening mode is reentered at 611.

At block 651 the controller looks to see if the next burst has started. If so, the controller enters the stimulus delivery mode at 661 and checks the flag to determine whether to deliver an audible-only (at 662) or and audible-plus-shock (at 663) stimulus. Thus, in this embodiment, the controller delivers the stimulus after every other detected burst.

After delivering the stimulus, the controller enters the wait-for mode at 671 and waits until the current burst of pulses is over before clearing the registers beginning at 681, and then returns to the listen mode at 611.

The flow diagram in FIG. 6 further provides for a warning zone before the avoidance zone. Such a warning zone extends an additional five to ten feet from the avoidance zone. When the animal enters the avoidance zone, only an auditory signal is delivered. If the animal continues beyond the warning zone, however, and proceeds into the avoidance zone, a shock is delivered. This is accomplished by decreasing the threshold sensitivity of the controller after initial detection of the radio signal. The sensitivity is decreased by some set amount, preferably about 5–20%, and more preferably about 10%.

Implementation of the warning zone is illustrated in FIG. 6 at block 691. Block 691 reduces the gain of the signal at the comparator 406 (see FIG. 4; see also R4 in FIG. 5A). If pulses are no longer detected (RTCC doesn't change) after the gain is reduced, only an audible stimulus will be delivered because the animal is in the warning zone. If pulses are still detected after the gain is reduced at 691, and provided that the audible-plus-shock burst length is detected, then an audible-plus-shock stimulus will be delivered because the animal is in the avoidance zone. The gain is restored to the original amount before reentering the listen mode.

Protection logic is provided to guard against over-stimulating the animal. After a certain number of shocks (preferably between 100 and 200 shocks), shock delivery is disabled until the signal is undetected for a given period of time (not shown). Thus, if the animal becomes trapped in the avoidance zone, the animal will not be over-stimulated with shocks (and instead only an audible signal is emitted which may be heard by the trainer who can free the animal). The logic in the controller further includes a routine to provide the animal with a shock after a certain number of consecutive audible-only stimuli. Thus, if the animal becomes calloused to the audible-only stimulus a shock may provide sufficient incentive to leave the avoidance and/or warning zone. Again, the routine to provide this shock stops shock delivery after a certain number of shocks.

Power Supply

The receiver unit, including the controller and the shock driver, is powered by the power supply, preferably a long-life battery pack. In one embodiment the power supply is one 3.6V lithium battery, though other power supplies may be used instead. Preferably, the battery life in a no signal environment is as long as the greater part of two year's time; a lithium battery has a life in this system of approximately 24 months in a no signal environment, an approximately 25 µAmp drain.

If the receiver unit is in a field, whether produced by the system transmitter or by an interfering source, the battery drain increases; however, it is desirable to restrict the increase in current to as low a value as practical especially in an interfering field.

Preferably the receiver is electronically disabled when an interfering signal is detected, so that current drain is diminished while the animal is in an interfering field. When the animal carries the receiver beyond the detectable range of the interfering signal, it becomes re-enabled and resumes operation.

Avoidance Zone Test

In preferred embodiments, a continuity tester such as a test light is provided for testing the receiver's capacity to deliver an adequate shock stimulus. The test light 133 is provided on the actuator 130 as shown in FIG. 1B. The user holds contact points on the actuator on the contact posts, and then carries the receiver unit 120 into the avoidance zone. When the receiver picks up the signal from the boundary wire, the audible warning sounds at the receiver loudspeaker SP1 and the test light 133 lights.

The system can be tested after installation and before use as follows. The power switch is turned to "on", whereupon the red power indicator light and the green loop indicator light on the transmitter enclosure will come on. The radio signal can be tested by holding the test light pressed across the electrodes on the receiver and carrying the receiver towards the boundary wire at numerous places along the boundary.

Other Embodiments

Numerous other embodiments are within the following claims.

For example, the stimulation regime can be varied. The regime described above, includes two types (audible-only and audible-plus shock), three rates (low, medium and high) and three intensities (low, medium and high) of stimulus. Other combinations can be used and different types, rates and/or intensities of stimulus may be delivered. Alternative stimulation types include, a release of a rapidly dispersing temporarily irritating substance such as, for example, ammonia, as a gas or aerosol.

Numerous other configurations of the magnetically actuated switch may be utilized. For example, more than one switch can used to deliver commands to the controller. A first switch could vary the intensity of stimulus and a second switch could vary the rate of stimulus delivered to the animal. Each switch could be connected to the speaker to indicate the command that was delivered, and the speaker may produce different sounds corresponding to the commands delivered by the two switches. The switch may provide an on/off command to the receiver unit which prevents the receiver unit from delivering the stimulus. Additionally, a light or LED in the housing or the actuator could indicate the various commands input at the switch.

Other configurations may be used for the coded transmitter signal. The pulse rate can be other than the approximately 8 kHz rate described in the examples. Burst repetition rates (and, hence, the rate of stimulus) other than those illustrated can be used, and others may prove more effective for different breeds and types of animals; rates as low as about 3 bursts per second and as high as about 300 bursts per second have been shown to be effective. A different range of selectable repetition rates can be provided.

The intensity of each shock in the stimulus series can be different from that shown, although shocks at approximately 2000, 3500 or 5000 volts, delivering approximately 5 mA, appear to be effective for canines; currents in the range between about 1 mA and about 30 mA also appear effective. The shock energy and shock pulse shape can differ, particularly for different types and breeds of animal. Burst lengths other than those illustrated can be used to encode the audible-plus-shock mode and the audible-only mode, and maximum length for non-pulse (interfering, effectively continuous-wave) signals.

It is possible that an animal may under some circumstances (for example, illness, or imperfect training) respond to the aversive shock stimulus by assuming a submissive posture, and remaining within the avoidance zone; or the animal may become trapped in the avoidance zone. Because the illustrative embodiment provides for continuous stimulation for as long as the animal remains within the avoidance zone, the animal under these circumstances will not leave the avoidance zone, and if unattended in these circumstances will be overstimulated. The stimulation regime can be altered to avoid such overstimulation by automatically switching from the audible-plus-shock mode to an audible mode (or turn all stimulation off) after some period of continuous electrical shock stimulation, thereby allowing the animal relief from long term repeated shock or other aversive stimulus.

It should be understood that the preceding is merely a detailed description of certain preferred embodiments. It therefore should be apparent to those skilled in the art that various modifications and equivalents can be made without departing from the spirit or scope of the invention.

What is claimed is:

1. An apparatus to aid in training an animal, comprising:
 a housing removably attachable to the animal;
 a transducer mounted to the housing for delivering a stimulus to the animal;
 a magnetically actuated switch, disposed within the housing and coupled to the transducer, for controlling at least one of
   (i) a type of stimulus delivered by the transducer to the animal,
   (ii) a rate of stimulus delivered by the transducer to the animal, and
   (iii) an intensity of stimulus delivered by the transducer to the animal;
 a magnet, external to the housing, for actuating the switch externally from the housing by disposing the magnet within a reaction zone of the switch;
 a controller, coupled to the switch and to the transducer, for interpreting a command applied by a user using the magnet, the command corresponding to at least one of the rate, the type and the intensity of stimulus delivered to the animal; and
 an indicator, coupled to the controller, for indicating to the user the command applied by the user.

2. The apparatus according to claim 1, wherein the controller interprets the command based upon a time period during which the user actuates the switch.

3. The apparatus according to claim 2, wherein the controller interprets a first time period of switch actuation as a first command, a second time period of switch actuation as a second command, and a third time period of switch actuation as a third command.

4. The apparatus according to claim 2, wherein the controller includes circuitry for generating an audio signal corresponding to the period of time that the switch is actuated by the user.

5. The apparatus according to claim 1, wherein the controller interprets the command based upon the number of times the user actuates the switch by repetitively disposing the magnet within and removing the magnet from the reaction zone.

6. The apparatus according to claim 1, wherein the controller includes circuitry for generating a stimulus signal based upon the command and applies the stimulus signal to the transducer to control any of the type, the rate or the intensity of the stimulus delivered by the transducer to the animal.

7. The apparatus according to claim 1, wherein the switch further controls an on/off condition of the apparatus based upon the command.

8. The apparatus according to claim 1, wherein the switch is a reed switch.

9. The apparatus according to claim 1, further comprising a receiver coupled to the controller for receiving a coded radio signal which activates delivery of the stimulus to the animal.

10. The apparatus according to claim 9, wherein the coded radio signal includes radio commands interpreted by the controller for controlling any of the type, rate and intensity of stimulus delivered by the transducer to the animal.

11. The apparatus according to claim 10, wherein the controller controls the type and rate of stimulus delivered by the transducer to the animal based upon the radio commands and controls the intensity of stimulus delivered by the transducer to the animal based upon the commands from the switch.

12. The apparatus according to claim 10, wherein the controller includes adjustable sensitivity circuitry for defining a threshold strength of the coded radio signal below which delivery of the stimulus is prevented.

13. The apparatus according to claim 12, wherein the transducer includes a plurality of electrodes in contact with the animal and the type of stimulus includes an electric shock transmitted through the plurality of electrodes.

14. The apparatus according to claim 13, wherein the transducer includes a speaker and the type of stimulus includes a noise transmitted through the speaker.

15. The apparatus according to claim 14, wherein the controller includes circuitry for automatically switching the type of stimulus from the noise to the electric shock after a predetermined period.

16. The apparatus according to claim 9, wherein the controller includes overcorrection circuitry for automatically arresting delivery of the stimulus after a predetermined period.

17. The apparatus according to claim 9, wherein the controller includes recognition circuitry which prevents the controller from activating delivery of the stimulus except upon recognition of the coded radio signal.

18. The apparatus according to claim 9, wherein the controller includes adjustable sensitivity circuitry for reducing the sensitivity of the receiver upon detection of the coded radio signal, whereupon the controller delivers a warning stimulus if the coded signal is not detected subsequent to such sensitivity reduction.

19. The apparatus according to claim 18, wherein the warning stimulus delivered to the animal is a noise.

20. The apparatus according to claim 18, wherein the adjustable sensitivity circuitry includes gain reducing circuitry.

21. The apparatus according to claim 1, wherein the housing is watertight.

22. The apparatus according to claim 21, further comprising a battery mounted to the housing and coupled to the controller for supplying power to the apparatus.

23. The apparatus according to claim 22, wherein the housing includes a battery cavity and the cavity is sealed with a removable watertight battery cap.

24. The apparatus according to claim 1, wherein the indicator includes a speaker.

25. A method of training an animal by delivering a stimulus to the animal, comprising the steps of:

attaching a housing to the animal which includes a transducer mounted to the housing for delivering the stimulus to the animal, and includes a magnetically actuated switch coupled to the transducer;

actuating the magnetically actuated switch with a magnet to control at least one of
(i) a type of stimulus delivered by the transducer to the animal,
(ii) a rate of stimulus delivered by the transducer to the animal, and
(iii) an intensity of stimulus delivered by the transducer to the animal;

detecting a coded radio signal with a receiver;

delivering the stimulus based upon detection of the radio signal; and after the detection step, the steps of
reducing the sensitivity of the receiver,
attempting to detect the coded radio signal, and
delivering a warning stimulus upon failure to detect the coded radio signal.

26. The method according to claim 25, wherein the warning stimulus is a noise.

* * * * *